No. 808,588. PATENTED DEC. 26, 1905.
J. E. W. TRACY.
MACHINE FOR MEASURING AND PACKAGING SEEDS.
APPLICATION FILED FEB. 23, 1905.
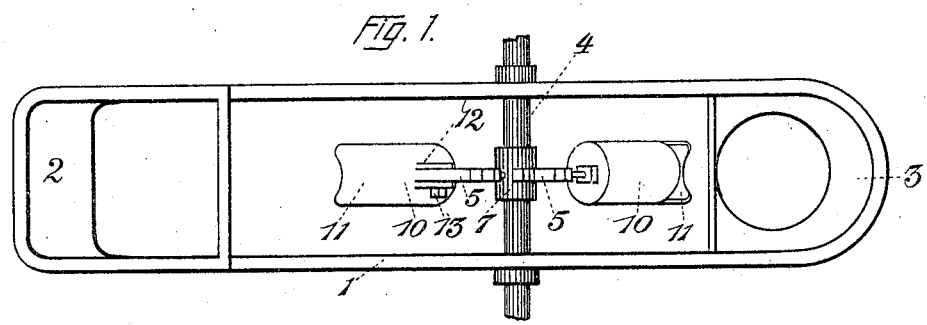
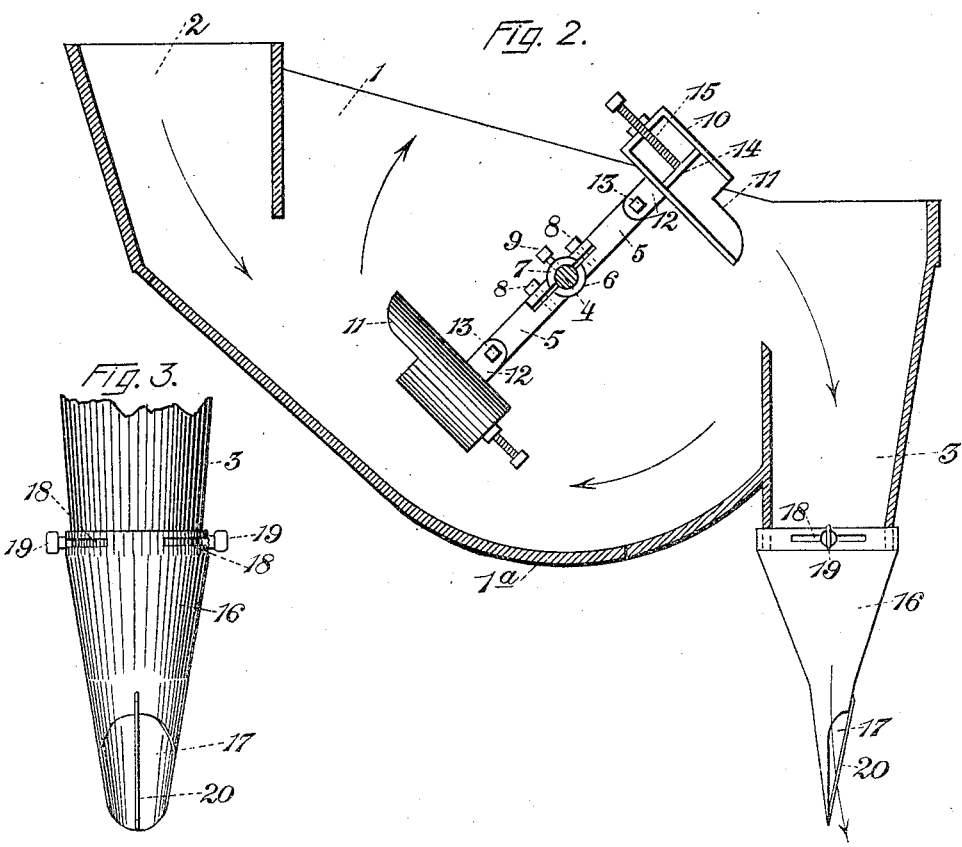
Witnesses.
Kenneth P. Clarke
E. W. Shepard
Inventor:
Jonathan E. W. Tracy
By James W. Bevans
His Attorney.

UNITED STATES PATENT OFFICE.

JONATHAN E. W. TRACY, OF WASHINGTON, DISTRICT OF COLUMBIA.

MACHINE FOR MEASURING AND PACKAGING SEEDS.

No. 808,588.  Specification of Letters Patent.  Patented Dec. 26, 1905.

Application filed February 23, 1905. Serial No. 247,068.

*To all whom it may concern:*

Be it known that I, JONATHAN E. W. TRACY, a citizen of the United States, residing at Washington, in the District of Columbia, have invented certain new and useful Improvements in Machines for Measuring and Packaging Seeds, of which the following is a specification.

This application is made under the act of March 3, 1883, chapter 143, and the invention herein described and claimed may be used by the Government of the United States or any of its officers or employees in the prosecution of work for the United States without the payment of any royalty thereon.

This invention relates to an improved machine for measuring and packaging seeds; and the object is to provide a simple and effective machine by means of which bags may be readily filled with predetermined quantities of seed.

With the above object in view the invention consists in the novel features of construction hereinafter fully described, particularly pointed out in the claims, and clearly illustrated by the accompanying drawings, in which—

Figure 1 is a top plan view of a machine constructed in accordance with my invention; Fig. 2, a vertical sectional view of the same; and Fig. 3, a detail view in elevation of the funnel, showing its construction and manner of attachment to the outlet-spout of the hopper.

Referring now more particularly to the drawings, 1 designates the hopper, in which the seed to be packaged is introduced through an inlet 2. Said hopper is provided at the end opposite to the inlet 2 with an outlet-spout 3. A door 1ª is provided in the bottom of the hopper, by means of which the seed may be removed, if desired. Extending transversely of the hopper is a shaft 4, which may be driven by any suitable driving mechanism. (Not shown.) Radially-extending arms 5 are attached to the shaft, two being illustrated, disposed on opposite sides of the shaft. The arms are illustrated as formed integral with a half-collar 6 to engage the shaft, the other half 7 of the collar being removably secured to the arms by screws 8. A set-screw 9 passing through the collar engages the shaft and holds the arms from movement thereon. By removing the screws 8 the arms may be readily removed from the shaft.

Adjustably secured to each arm 5 is a measuring and seed-delivering cup 10, having projecting from its outlet end at its lower edge a lip 11 for the purpose presently to be set forth. Each cup has projecting from its under side two spaced lugs 12 to receive therebetween the end of the arm to which it is secured, a securing-screw 13 passing therethrough and through the arm, thus adjustably securing the cup to the arm. Movable in each cup to vary the capacity thereof is a disk 14, to which the inner end of an adjusting-screw 15 is attached, said screw being threaded through the rear wall of the cup. The capacity of the cup may be thus varied, according to the character of the seed and the quantity to be placed in said package.

Adjustably secured to the lower end of the outlet-spout is a funnel 16, having its smaller end flattened somewhat and formed in one side thereof with an outlet 17. The upper end of the funnel is formed on opposite sides of the latter with horizontally-extending slots 18, through which thumb-screws 19 pass, said screws being threaded into the walls of the spout. By this construction the funnel may be adjusted upon the spout to bring its outlet end in convenient position to accommodate the particular operator using the machine.

In operation the seed to be packaged is placed in the hopper through the inlet thereof, and the cups having been adjusted to the proper capacity the power is applied and the shaft rotated. As the shaft rotates the cups successively enter the supply of seed in the hopper and are filled therewith. The seed is conveyed by the cups to the proper point and discharged into the outlet-spout. The lips projecting from the outlet ends of the cups prevent any of the seed carried by the latter from falling into the hopper at and during the discharge thereof. It is necessary that the cups be set at a certain angle in order that all of the seed will be discharged therefrom before the mouth of the outlet-spout is passed thereby, and this angle must be varied, owing to the difference in the movement of the various-sized seeds, and this is provided for by adjustably securing the cups to the arms by means of the screws 13. The bags to be filled are slipped over the flat discharge end of the funnel one by one by the operator and removed when the contents of the cups has been received therein. In slipping the bags upon the discharge end of the funnel rapidly they are liable to catch or be torn by engaging the edge of the wall of the discharge-opening, and to obviate this I attach a piece of wire or metal 20 to the funnel, said wire extending vertically across the opening, as illustrated. This wire prevents engagement of the edge of the mouth of the bag with the edge of the discharge-opening, as will be readily understood.

I do not limit my invention to the particular form of hopper shown or to the other details of construction shown and described, and many changes and modifications may be made without departing from the spirit and scope thereof.

Having thus fully described my invention, what I claim as new, and desire to secure by Letters Patent of the United States, is—

1. In a machine of the character described, a hopper to contain the seed to be packaged having an outlet, a shaft mounted to revolve in said hopper, a laterally-extending arm carried by said shaft, a cup adjustably mounted on said arm for delivering the seed to the outlet, adjustable to the desired angle relative to the said arm, and means for securing the cup in its adjustment.

2. In a machine of the character described, a hopper to contain the seed to be packaged having an outlet, a shaft mounted to revolve in said hopper, a laterally-extending arm carried by said shaft, a cup pivotally attached to said arm so as to be adjustable to different angles with respect to the arm, and means for securing the cup in its adjustment.

3. In a machine of the character described, a hopper to contain the seeds to be packaged having an outlet, a funnel attached to said outlet having its lower end flattened and formed with a discharge-opening in said flattened portion, and a strip extending across said opening from the lower edge to the upper edge thereof for preventing engagement of the edges of the bag with the edge of the discharge-opening.

In testimony whereof I affix my signature in presence of two witnesses.

JONATHAN E. W. TRACY.

Witnesses:
GEO. B. McCABE,
E. D. YERBY.